(12) United States Patent
Seven et al.

(10) Patent No.: US 9,598,565 B2
(45) Date of Patent: Mar. 21, 2017

(54) OPTICAL FIBER CABLE COMPONENTS

(71) Applicant: Dow Global Technologies LLC, Midland, MI (US)

(72) Inventors: Karl M. Seven, Auburn, PA (US); Chester J. Kmiec, Phillipsburg, NJ (US); Bharat I. Chaudhary, Princeton, NJ (US); Mohamed Esseghir, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/035,264

(22) PCT Filed: Nov. 12, 2014

(86) PCT No.: PCT/US2014/065117
§ 371 (c)(1),
(2) Date: May 9, 2016

(87) PCT Pub. No.: WO2015/094516
PCT Pub. Date: Jun. 25, 2015

(65) Prior Publication Data
US 2016/0289433 A1    Oct. 6, 2016

Related U.S. Application Data

(60) Provisional application No. 61/917,674, filed on Dec. 18, 2013.

(51) Int. Cl.
*G02B 6/44*   (2006.01)
*C08L 23/06*  (2006.01)
(Continued)

(52) U.S. Cl.
CPC ............ *C08L 23/06* (2013.01); *G02B 6/4433* (2013.01); *G02B 6/4486* (2013.01); *H01B 3/441* (2013.01);
(Continued)

(58) Field of Classification Search
CPC .. C08L 2207/00; C08L 2207/62; C08L 23/06; G02B 6/38
See application file for complete search history.

(56) References Cited

U.S. PATENT DOCUMENTS 5,574,816 A    11/1996   Yang et al.
6,028,145 A    2/2000    Niebergall et al.
(Continued)

FOREIGN PATENT DOCUMENTS

| EP | 0890860 A2 | 1/1999 |
| WO | 2014003908 A1 | 1/2014 |
| WO | 2014099350 A1 | 6/2014 |

OTHER PUBLICATIONS

RRobert Shanks, "Nucleating agents for thermoplastics" 1998, vol. 1 Series Polymer Science and Technology, 464-471.*
(Continued)

*Primary Examiner* — Sung Pak
*Assistant Examiner* — Hoang Tran

(57) ABSTRACT

Polymeric compositions comprising a high-density polyethylene, a crystalline polypropylene, and an olefin block composite. Optical cable components fabricated from an extrudable polymeric composition of high-density polyethylene, a crystalline polypropylene, and an olefin block composite. Optionally, the polymeric composition can further comprise a nucleating agent. The polymeric composition may also contain one or more additives. The optical fiber cable components can be selected from buffer tubes, core tubes, and slotted core tubes, among others.

8 Claims, 2 Drawing Sheets

(51) Int. Cl.
*H01B 3/44* (2006.01)
*H01B 7/28* (2006.01)

(52) U.S. Cl.
CPC ...... *H01B 7/2813* (2013.01); *C08L 2203/206* (2013.01); *C08L 2205/03* (2013.01); *C08L 2205/24* (2013.01); *C08L 2207/062* (2013.01)

(56) References Cited

U.S. PATENT DOCUMENTS

| | | |
|---|---|---|
| 6,809,154 B2 | 10/2004 | Lindahl et al. |
| 6,931,184 B2 | 8/2005 | Tedder et al. |
| 2006/0045439 A1 | 3/2006 | Brown et al. |
| 2006/0131052 A1 | 6/2006 | Mhetar et al. |
| 2007/0066733 A1* | 3/2007 | Hanssen ............ C08K 5/0083 524/394 |
| 2011/0313106 A1 | 12/2011 | Shan et al. |
| 2011/0313107 A1 | 12/2011 | Shan et al. |
| 2011/0313108 A1 | 12/2011 | Shan et al. |

OTHER PUBLICATIONS

PCT/US2014/065117, International Search Report and Written Opinion with a mailing date of Feb. 9, 2015.
PCT/US2014/065117, International Preliminary Report on Patentability with a mailing date of Jun. 30, 2016.

\* cited by examiner

OPTICAL FIBER CABLE COMPONENTS

REFERENCE TO RELATED APPLICATIONS

The present application claims the benefit of U.S. Provisional Application No. 61/917,674, filed on Dec. 18, 2013.

FIELD

Various embodiments of the present invention relate to polymeric compositions comprising a high-density polyethylene, a crystalline polypropylene, and an olefin block composite. Additional embodiments relate to buffer-tube, core-tube, or slotted-core fiber optic cable components made from an extrudable blend of high-density polyethylene, crystalline polypropylene, and an olefin block composite.

INTRODUCTION

Optical fibers efficiently transmit information at high rates and over long distances. These fibers are delicate and need to be protected. In practical application, a fiber optic cable protects the fibers from mechanical damage and/or adverse environmental conditions such as moisture exposure. For example, specific protective components include extruded buffer tubes, core tubes, and slotted core members.

Buffer tubes, also known as loose buffer tubes, are protection components used to house and protect optical fibers, such as in a cable. Typically, these loose buffer tubes are filled with a hydrocarbon gel or grease to suspend and protect the fiber from moisture and have stringent requirements for high crush resistance, resistance to micro-bending, low brittleness temperature, good grease compatibility, impact resistance, and low post-extrusion shrinkage. Materials used in the manufacture of the buffer tubes include polybutylene terephthalate ("PBT"), high-crystallinity polypropylene, and to a lesser extent high-density polyethylene. PBT is a high-cost material, and cost-effective alternatives are desired.

SUMMARY

One embodiment is a polymeric composition, comprising:
(a) a bimodal high-density polyethylene;
(b) a crystalline polypropylene; and
(c) an olefin block composite,
wherein said bimodal high-density polyethylene is present in said polymeric composition in an amount greater than said crystalline polypropylene.

Another embodiment is an extruded optical cable protective component comprising an extruded polymeric blend, said extruded polymeric blend comprising:
(a) a high-density polyethylene;
(b) a crystalline polypropylene; and
(c) an olefin block composite,
wherein said high-density polyethylene is present in said polymeric composition in an amount greater than said crystalline polypropylene.

BRIEF DESCRIPTION OF THE DRAWINGS

Reference is made to the accompanying drawings in which.

DETAILED DESCRIPTION

Figure 1:
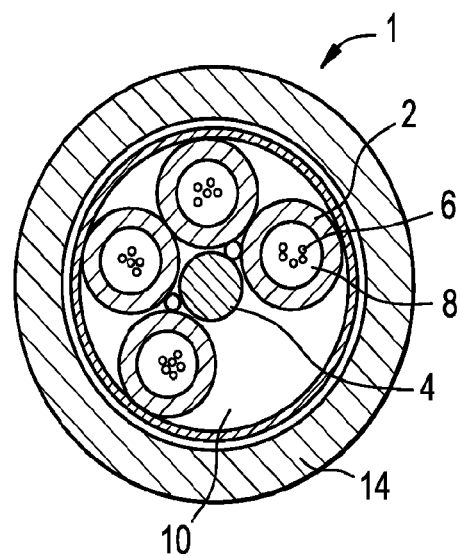
FIG. 1 shows a cross-sectional view of a loose buffer tube optical fiber cable.

Various embodiments of the present invention concern polymeric compositions comprising a high-density polyethylene ("HDPE"), a crystalline polypropylene, and an olefin block composite. Optionally, the polymeric composition can further comprise a nucleating agent. The polymeric composition may also contain one or more additives. Such polymeric compositions can be extruded to form optical fiber cable protective components.

High-Density Polyethylene

The high-density polyethylene suitable for use herein can be any high-density polyethylene known or hereafter discovered in the art. As known to those of ordinary skill in the art, HDPEs are ethylene-based polymers having densities greater than 0.940 g/cm$^3$. Polymer densities provided herein are determined according to ASTM International ("ASTM") method D792. In an embodiment, the HDPE can have a density from 0.945 to 0.970 g/cm$^3$, or from 0.945 to 0.955 g/cm$^3$. The HDPE can have a peak melting temperature of at least 124° C., or from 124 to 135° C. The HDPE can have a melt index ($I_2$) ranging from 0.1 grams per 10 minutes ("g/10 min."), or 0.2 g/10 min., or 0.3 g/10 min., or 0.4 g/10 min., up to 5.0 g/10 min., or 4.0 g/10 min., or, 3.0 g/10 min. or 2.0 g/10 min., or 1.0 g/10 min., or 0.5 g/10 min. Melt indices provided herein are determined according to ASTM method D1238. Unless otherwise noted, melt indices are determined at 190° C. and 2.16 Kg (i.e., $I_2$). Melt indices determined using a 21.6-Kg weight are denoted as "$I_{21.6}$". Also, the HDPE can have a polydispersity index ("PDI") in the range of from 1.0 to 30.0, or in the range of from 2.0 to 15.0, as determined by gel permeation chromatography.

The HDPE suitable for use herein can be either unimodal or bimodal. As used herein, "unimodal" denotes an HDPE having a molecular weight distribution ("MWD") such that its gel permeation chromatography ("GPC") curve exhibits only a single peak with no discernible second peak, or even a shoulder, hump, or tail relative to such single peak. In contrast, as used herein, "bimodal" means that the MWD in a GPC curve exhibits the presence of two component polymers, such as by having two peaks or where one component may be indicated by a hump, shoulder, or tail relative to the peak of the other component polymer. In various embodiments, the HDPE is unimodal. In other embodiments, the HDPE is bimodal.

When the HDPE employed is a unimodal HDPE, the HDPE can be an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as chain transfer agents. In an embodiment, the ethylene-based polymer can be an ethylene/alpha-olefin ("α olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3 cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

Preparation methods for unimodal HDPEs are well known in the art. Any methods known or hereafter discovered for preparing a unimodal HDPE having the desired properties may be employed for making the unimodal HDPE. A suitable preparation method for making the unimodal HDPE can be found, for example, in U.S. Pat. No. 4,303,771.

An example of a commercially available unimodal HDPE includes, but is not limited to, DGDL-3364NT, available from The Dow Chemical Company, Midland, Mich., U.S.A.

When the HDPE employed is a bimodal HDPE, such HDPE can comprise a first polymeric component and a second polymeric component. In various embodiments, the first component can be an ethylene-based polymer; for example, the first component can be a high-molecular-weight ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight.

The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In an embodiment, the alpha-olefin comonomers can be selected from the group consisting of propylene, 1-butene, 1-hexene, and 1-octene. In other embodiments, the alpha-olefin comonomers can be selected from the group consisting of 1-hexene and 1-octene.

The first component of the bimodal HDPE can have a density in the range of from 0.915 to 0.940 g/cm³, from 0.920 to 0.940 g/cm³, or from 0.921 to 0.936 g/cm³. The first component can have a melt index ($I_{21.6}$) in the range of from 0.5 to 10 g/10 min., from 1 to 7 g/10 min., or from 1.3 to 5 g/10 min. The first component can have a molecular weight in the range of from 150,000 to 375,000 g/mol, from 175,000 to 375,000 g/mol, or from 200,000 to 375,000 g/mol.

The second polymeric component of the bimodal HDPE can be an ethylene-based polymer; for example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 percent by weight of one or more alpha-olefin comonomers. The second component can comprise at least 99 wt % of ethylene, or in the range of from 99.5 to 100 wt % of ethylene, based on the weight of the second component.

The second component of the bimodal HDPE can have a density in the range of from 0.965 to 0.980 g/cm³, or from 0.970 to 0.975 g/cm³. The second component can have a melt index ($I_2$) in the range of from 50 to 1,500 g/10 min., from 200 to 1,500 g/10 min., or from 500 to 1,500 g/10 min. The second component can have a molecular weight in the range of 12,000 to 40,000 g/mol, from 15,000 to 40,000 g/mol, or from 20,000 to 40,000 g/mol.

Preparation methods for bimodal HDPEs are well known in the art. Any methods known or hereafter discovered for preparing a bimodal HDPE having the desired properties may be employed for making the bimodal HDPE. A suitable preparation method for making bimodal HDPE can be found, for example, in U.S. Patent Application Publication No. 2009-0068429, paragraphs [0063] to [0086].

An example of a commercially available bimodal HDPE includes, but is not limited to, DMDA-1250NT, available from The Dow Chemical Company, Midland, Mich., U.S.A.

In one or more embodiments, the HDPE component is present in an amount that is greater than the amount of crystalline polypropylene in the polymeric composition. For example, the HDPE component can be present in an amount that is at least 5%, at least 10%, at least 20%, at least 30%, at least 40%, at least 50%, or even up to 100% or 200% greater than the amount of crystalline polypropylene in the polymeric composition. In various embodiments, the HDPE can be present in the polymeric composition in an amount of at least 10 wt %, at least 25 wt %, at least 50 wt %, in the range of from 50 to 95 wt %, in the range of from 50 to 80 wt %, or in the range of from 50 to 65 wt %, based on the total polymeric composition weight.

In various embodiments, the polymeric composition described herein contains less than 1 wt % low-density-polyethylene ("LDPE"), less than 0.1 wt % LDPE, less than 0.01 wt % LDPE, or less than 0.001 wt % LDPE. In certain embodiments, the polymeric composition described herein contains no LDPE.

Crystalline Polypropylene

As noted above, the polymeric composition further comprises a crystalline polypropylene. As used herein, a "crystalline polypropylene" is a polypropylene having at least some measureable quantity of crystallinity, as determined according to the method described below. In various embodiments, the crystalline polypropylene can be an isotactic or syndiotactic homopolymer polypropylene, or mixtures thereof. In one or more embodiments, the crystalline polypropylene can be an isotactic homopolymer polypropylene, in order to maximize the crystallinity of the polymer.

The polypropylene used in the present invention is known in the literature and can be prepared by known techniques. In general, the polypropylene can be made with Ziegler-Natta catalysts or metallocene catalysts. "Kirk-Othmer Encyclopedia of Chemical Technology" (2001) describes these catalysts and their corresponding reactor processes for making crystalline polypropylenes.

The crystallinity of the polypropylene can be measured by differential scanning calorimetry ("DSC"). In this measurement, a small sample of the propylene polymer is sealed into an aluminum DSC pan. The sample is placed into a DSC cell with a 25-centimeter-per-minute nitrogen purge and cooled to about −100° C. A standard thermal history is established for the sample by heating at 10° C. per minute to 225° C. The sample is then re-cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity percent} = (\Delta H_{observed})/(\Delta H_{isotactic\ pp}) \times 100$$

where the heat of fusion for isotactic polypropylene ($\Delta H_{isotactic\ pp}$) is reported in B. Wunderlich, Macromolecular Physics, Volume 3, Crystal Melting, Academic Press, New York, 1960, p 48, as 165 Joules per gram (J/g) of polymer. In various embodiments, the crystalline polypropylene can have a crystallinity of at least 50 wt %, at least 55 wt %, at least 65 wt %, at least 70 wt %, or at least 73 wt %.

In one or more embodiments, the crystalline polypropylene can have a melt index ($I_2$) ranging from 1 to 20 g/10 min., from 1 to 12 g/10 min., from 2 to 9 g/10 min., from 2 to 8 g/10 min., or from 3 to 6 g/10 min.

U.S. Pat. No. 7,087,680, filed Oct. 7, 2003, discloses an example of a crystalline polypropylene useful in various embodiments of the present invention. An example of a commercially available crystalline polypropylene includes, but is not limited to, BRASKEM™ FF018F, available from Braskem America, Inc., Philadelphia, Pa., U.S.A. In various embodiments, the crystalline polypropylene can be present in the polymeric composition in an amount of less than 50 wt %, less than 45 wt %, in the range of from 5 to 45 wt %, or in the range of from 25 to 40 wt %, based on the total polymeric composition weight.

Olefin Block Composite

As noted above, the polymeric composition comprises at least one olefin block composite. The term "block composite" refers to polymer compositions comprising three components: (1) a soft copolymer, (2) a hard polymer, and (3) a block copolymer having a soft segment and a hard segment. The hard segment of the block copolymer is the same composition as the hard polymer in the block composite and the soft segment of the block copolymer is the same composition as the soft copolymer of the block composite.

The block copolymers present in the olefin block composite can be linear or branched. More specifically, when produced in a continuous process, the block composites can have a PDI from 1.7 to 15, from 1.8 to 3.5, from 1.8 to 2.2, or from 1.8 to 2.1. When produced in a batch or semi-batch process, the block composites can have a PDI from 1.0 to 2.9, from 1.3 to 2.5, from 1.4 to 2.0, or from 1.4 to 1.8. The term "olefin block composite" refers to block composites prepared solely or substantially solely from two or more α-olefin types of monomers. In various embodiments, the olefin block composite can consist of only two α-olefin type monomer units. An example of an olefin block composite would be a hard segment and hard polymer comprising only or substantially only propylene monomer residues with a soft segment and soft polymer comprising only or substantially only ethylene and propylene comonomer residues. In describing olefin block composites, "hard" segments refer to highly crystalline blocks of polymerized units in which a single monomer is present in an amount greater than 95 mol %, or greater than 98 mol %. In other words, the comonomer content in the hard segments is less than 5 mol %, or less than 2 mol %. In some embodiments, the hard segments comprise all or substantially all propylene units. "Soft" segments, on the other hand, refer to amorphous, substantially amorphous or elastomeric blocks of polymerized units having a comonomer content greater than 10 mol %. In some embodiments, the soft segments comprise ethylene/propylene interpolymers.

When referring to block composites, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and one or more copolymerizable comonomers, where a plurality of the polymerized monomer units of at least one block or segment in the polymer (the crystalline block) comprises propylene, which can be present in an amount of at least 90 mole percent, at least 95 mole percent, or at least 98 mole percent. A polymer made primarily from a different α-olefin, such as 4-methyl-1-pentene would be named similarly. The term "crystalline," when used to describe olefin block composites, refers to a polymer or polymer block that possesses a first order transition or crystalline melting point ("Tm") as determined by differential scanning calorimetry ("DSC") or equivalent technique. The term "crystalline" may be used interchangeably with the term "semicrystalline." The term "amorphous" refers to a polymer lacking a crystalline melting point. The term, "isotactic" denotes polymer repeat units having at least 70 percent isotactic pentads as determined by $^{13}C$-nuclear magnetic resonance ("NMR") analysis. "Highly isotactic" denotes polymers having at least 90 percent isotactic pentads.

When referring to olefin block composites, the term "block copolymer" or "segmented copolymer" refers to a polymer comprising two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block composites employed herein are characterized by unique distributions of polymer PDI, block length distribution, and/or block number distribution, due, in a preferred embodiment, to the effect of shuttling agent(s) in combination with the catalyst(s) used in preparing the block composites.

The olefin block composite employed herein can be prepared by a process comprising contacting an addition polymerizable monomer or mixture of monomers under addition polymerization conditions with a composition comprising at least one addition polymerization catalyst, a cocatalyst and a chain shuttling agent ("CSA"), the process being characterized by formation of at least some of the growing polymer chains under differentiated process conditions in two or more reactors operating under steady state polymerization conditions or in two or more zones of a reactor operating under plug flow polymerization conditions.

Suitable monomers for use in preparing the olefin block composites of the present invention include any addition polymerizable monomer, such as any olefin or diolefin monomer, including any α-olefin. Examples of suitable monomers include straight-chain or branched α-olefins of 2 to 30, or 2 to 20, carbon atoms, such as ethylene, propylene, 1-butene, 1-pentene, 3-methyl-l-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene. In various embodiments, ethylene and at least one copolymerizable comonomer, propylene and at least one copolymerizable comonomer having from 4 to 20 carbons, 1-butene and at least one copolymerizable comonomer having 2 or from 5 to 20 carbons, or 4-methyl-1-pentene and at least one different copolymerizable comonomer having from 4 to 20 carbons can be employed. In an embodiment, the olefin block composites are prepared using propylene and ethylene monomers.

Comonomer content in the resulting block composites may be measured using any suitable technique, such as NMR spectroscopy. It is highly desirable that some or all of the polymer blocks comprise amorphous or relatively amorphous polymers such as copolymers of propylene, 1-butene, or 4-methyl-1-pentene and a comonomer, especially random copolymers of propylene, 1-butene, or 4-methyl-1-pentene with ethylene, and any remaining polymer blocks (hard segments), if any, predominantly comprise propylene, 1-butene or 4-methyl-1-pentene in polymerized form. Preferably such hard segments are highly crystalline or stereo-specific polypropylene, polybutene or poly-4-methyl-1-pentene, especially isotactic homopolymers.

Further, the block copolymers of the block composites comprise from 10 to 90 wt % hard segments and 90 to 10 wt % soft segments.

Within the soft segments, the mole percent comonomer may range from 5 to 90 wt %, or from 10 to 60 wt %. In the case where the comonomer is ethylene, it can be present in an amount from 10 to 75 wt %, or from 30 to 70 wt %. In an embodiment, propylene constitutes the remainder of the soft segment.

In an embodiment, the block copolymers of the olefin block composites comprise hard segments that are 80 to 100 wt % propylene. The hard segments can be greater than 90 wt %, 95 wt %, or 98 wt % propylene.

The block composites described herein may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites have a Block Composite Index ("BCI"), as defined below, that is greater than zero but less than 0.4, or from 0.1 to 0.3. In other embodiments, BCI is greater than 0.4 and up to 1.0. Additionally, the BCI can range from 0.4 to 0.7, from 0.5 to 0.7, or from 0.6 to 0.9. In some embodiments, BCI ranges from 0.3 to 0.9, from 0.3 to 0.8, from 0.3 to 0.7, from 0.3 to 0.6, from 0.3 to 0.5, or from 0.3 to 0.4. In other embodiments, BCI ranges from 0.4 to less than 1, from 0.5 to less than 1, from 0.6 to less than 1, from 0.7 to less than 1, from 0.8 to less than 1, or from 0.9 to less than 1. BCI is herein defined to equal the weight percentage of block copolymer divided by 100% (i.e., weight fraction). The value of the block composite index can range from 0 to less than 1, wherein 1 would be equal to 100% block copolymer and zero would be for a material such as a traditional blend or random copolymer. Methods for determining BCI can be found, for example, in U.S. Published Patent Application No. 2011/0082258 from paragraph [0170] to [0189].

The olefin block composites can have a Tm greater than 100° C., preferably greater than 120° C., and more preferably greater than 125° C. The melt index ("$I_2$") of the block composite can range from 0.1 to 1000 g/10 min., from 0.1 to 50 g/10 min., from 0.1 to 30 g/10 min., or from 1 to 10 g/10 min. The block composites can have a weight average molecular weight ("Mw") from 10,000 to 2,500,000, from 35,000 to 1,000,000, from 50,000 to 300,000, or from 50,000 to 200,000 g/mol.

Processes useful in producing the olefin block composites suitable for use in the present invention may be found, for example, in U.S. Patent Application Publication No. 2008/0269412, published on Oct. 30, 2008. Suitable catalysts and catalyst precursors for use in the present invention include metal complexes such as disclosed in WO 2005/090426, in particular, those disclosed starting on page 20, line 30 through page 53, line 20. Suitable catalysts are also disclosed in U.S. 2006/0199930; U.S. 2007/0167578; U.S. 2008/0311812; U.S. 2011/0082258; U.S. Pat. No. 7,355,089; and WO 2009/012215. Suitable co-catalysts are those disclosed in WO 2005/090426, in particular, those disclosed on page 54, line 1 to page 60, line 12. Suitable chain shuttling agents are those disclosed in WO 2005/090426, in particular, those disclosed on page 19, line 21 through page 20 line 12. Particularly preferred chain shuttling agents are dialkyl zinc compounds. The olefin block composites themselves are more fully described in U.S. Pat. No. 8,476,366.

In one or more embodiments, the olefin block composite can be present in the polymeric composition in an amount ranging from 1 to 20 wt %, from 2 to 15 wt %, or from 5 to 10 wt %, based on the entire polymeric composition weight.

Nucleating Agent

In various embodiments, a nucleating agent can be employed in the polymeric composition. Examples of suitable nucleating agents include ADK NA-11, available commercially from Asahi Denim Kokai, and HYPERFORM™ HPN-20E, available from Milliken Chemical. Persons of ordinary skill in the art can readily identify other useful nucleating agents. The nucleating agents can be included in the polymeric composition in amounts ranging from 0.08 to 0.3 wt %, from 0.09 to 0.25 wt %, or from 0.1 to 0.22 wt % based on the total polymeric composition weight.

Additives

In various embodiments, a hydrocarbon oil can also be included in the polymeric compositions. This additional component may reduce subsequent diffusion and absorption of undesirable low molecular weight species typically found in fiber-optical-cable grease, thereby improving the balance between impact performance and gel compatibility.

When employed, the hydrocarbon oil can be present in the polymeric compositions in an amount ranging from 0.2 to 10 parts per hundred resin ("phr"), or from 0.3 to 3.0 phr based on 100 weight parts of all polymer components present in the polymeric composition. Higher-molecular-weight hydrocarbon oils are more preferable than low-molecular-weight hydrocarbon oils. In various embodiments, the hydrocarbon oil can have a viscosity greater than 400 centistokes as measured by ASTM D-445. Additionally, the hydrocarbon oil can have a specific gravity between 0.86 and 0.90 as measured by ASTM D-1250. Also, the hydrocarbon oil can have a flash point greater than 300° C. as measured by ASTM D-92. Furthermore, the hydrocarbon oil can have a pour point greater than −10° C. as measured by ASTM D-97. Moreover, the hydrocarbon oil can have an aniline point between 80 and 300° C. as measured by ASTM D-611.

In various embodiments, the polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. Fillers may be included in the polymeric composition in an amount ranging from 0.1 to 20 phr based on 100 weight parts of all polymer components present in the polymeric composition.

The polymeric compositions may also contain other types of additives. Representative additives include, but are not limited to, antioxidants, cross-linking co-agents, cure boosters and scorch retardants, processing aids, coupling agents, ultraviolet stabilizers (including UV absorbers), antistatic agents, additional nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 phr or less to 20 phr or more based on 100 weight parts of all polymer components present in the polymeric composition.

Suitable UV light stabilizers include hindered amine light stabilizers ("HALS") and UV light absorber ("UVA") additives. Representative UVA additives include benzotriazole types such as Tinuvin 326 and Tinuvin 328 commercially available from Ciba, Inc. Blends of HAL's and UVA additives are also effective.

Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding

In one or more embodiments, the components of the polymeric composition used in the practice of this invention can be added to a batch or continuous mixer for melt blending. The components can be added in any order or first preparing one or more masterbatches for blending with the other components. Additives are usually blended with one or more other components before being added to the bulk resins and/or filler. In one embodiment, the additives can be added directly to the compounding line without the use of previously prepared masterbatches. Typically, melt blending is conducted at a temperature above the highest melting polymer but lower than the maximum compounding temperature of 285° C. The melt-blended composition can then either be delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

Molded electrical articles comprising the polymeric compositions of this invention can be made via an injection-molding process in which the compounded material is fed to the injection-molding machine to manufacture a molded part of a given design.

The resulting polymeric composition can have a miniwire line shrinkback at 21° C. of less than 0.8%, less than 0.78%, less than 0.75%, or less than 0.70%. Shrinkback is determined according to the procedure provided in the Test Methods section, below. Additionally, the polymeric composition can have a brittleness temperature of less than 0° C., less than −10° C., less than −20° C., less than −25° C., or less than −30° C. Brittleness temperature is determined according to the procedure provided in the Test Methods section, below.

Optical Fiber Cable

In various embodiments, an optical fiber cable can be prepared that includes at least one extruded optical protective component made from the polymer compositions described herein and incorporating at least one optical fiber transmission medium. A cross-sectional view of a common loose buffer tube optical fiber cable design is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods 10 can be used as low-cost spacers to occupy one or more buffer tube positions to maintain cable geometry. The cable jacket 14 is generally fabricated from a polyethylene-based material.

The buffer tubes 2 are typically filled with an optic cable grease or gel. Various gel compounds are available commercially, a number of which are hydrocarbon-based greases incorporating hydrocarbon oils. Others are polymer based and use a low viscosity polymer formulated with hydrocarbon oils and other additives for even lower viscosity for ease of filling. These greases and gels provide the suspension and protection needed in the immediate environment surrounding the fibers, including eliminating air space. This filling compound (also referred to as "gel" or "grease") provides a barrier against water penetration, which is detrimental to the optic transmission performance.

In either oil-based grease or polymer formulated with oil for lower viscosity, the hydrocarbon oils are typically low-molecular-weight hydrocarbon oils, which can be absorbed into polymeric buffer tubes. Absorption typically adversely affects the tube's mechanical properties, such as flexural modulus and crush resistance. A decrease in crush resistance renders the optic fibers more prone to mechanical stress, thereby permitting an increase in signal attenuation and increasing the possibility of catastrophic failure. Thus, good retention of modulus and crush resistance along with minimal oil absorption, commonly referred to as "grease compatibility," are important performance characteristics for polymeric materials to be used for making extruded optical protective component.

Many other buffer tube cable designs are possible. The size and materials of construction for the central strength and tensile member, the dimensions and number of buffer tubes, and the use of metallic armors and multiple layers of jacketing material are among the design elements.

Figure 2:
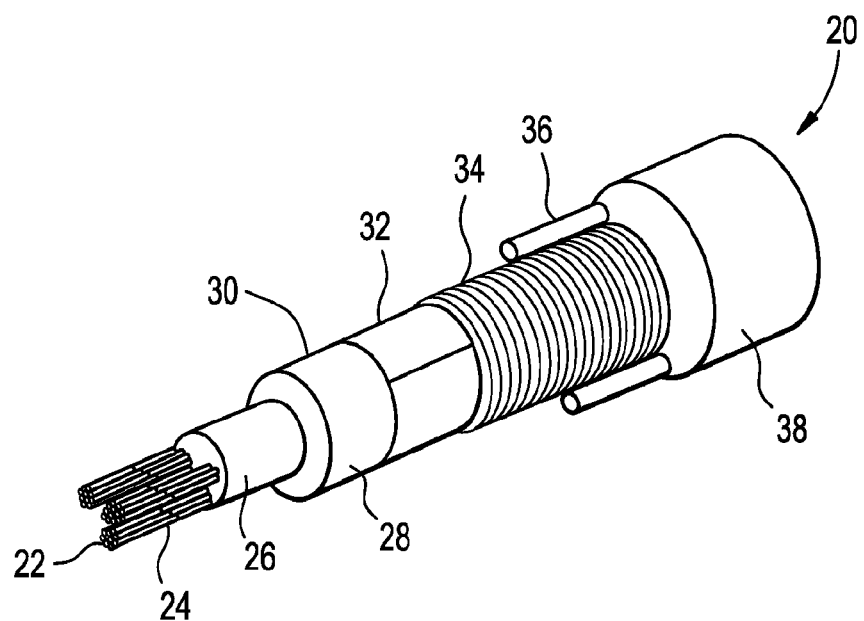
FIG. 2 shows a partial cutaway view of a core tube optical fiber cable.

A partial cutaway view of a typical core-tube optical fiber cable, also known as "central tube," is illustrated in FIG. 2. Bundles 24 of the optical fibers 22 are positioned near the center of the optical cable 20 within a central, cylindrical core tube 28. The bundles are embedded in a filling material 26. Water blocking tape 32 surrounds the ripcords 30, which are on the surface of the core tube. A corrugated, coated steel cylinder 34 surrounds the tape to protect the bundles. Wire strength members 36 provide the cable with strength and stiffness. A jacket 38, which is generally fabricated from a polyethylene-based material, surrounds all of the components. In this design, the mechanical functions are incorporated into the outer sheathing system composed of the core tube, polyolefin jacketing layers, tensile and compressive strength members, metallic armors, core wraps, water blocking components, and other components.

The core tube is typically larger in diameter than a buffer tube to accommodate bundles of fibers or the use of ribbon components containing the optic fibers. Color-coded binders are typically used to bundle and identify the fibers. The core tube can contain water blocking grease or super-absorbent polymer elements surrounding the optic fiber components. The optimal material characteristics for the core tube component are often similar to those of the buffer tube application.

Figure 3:
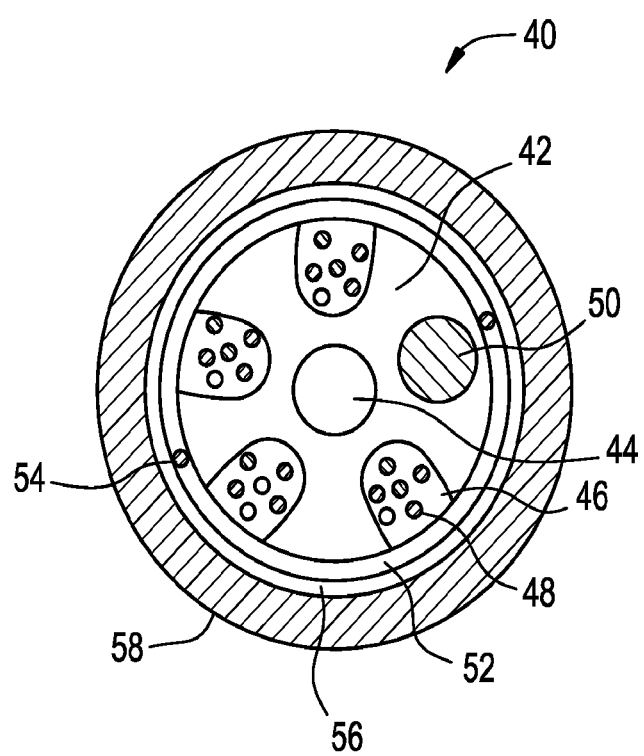
FIG. 3 shows a cross-sectional view of a slotted core optical fiber cable.

A cross-sectional view of a typical slotted-core cable design is shown in FIG. 3. The optical fiber cable 40 includes a jacket 58 and a slotted core 42, having a central member 44. The central member prevents buckling and controls axial shrinkage of the extruded slotted core profile shape. The jacket and the slotted core are typically made from a polyolefin-based material.

The slotted core has slots 46 in which optical fibers 48 are located. A filler rod 50 also may occupy one or more slots. A water-blocking layer 52, which may have one or more ripcords 54, surrounds the slotted core 42. A dielectric strength member layer 56 surrounds the water-blocking layer.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and grease are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post-extrusion shrinkage does not result in excessive slack in the optic fiber components.

The extruded optical protective components, along with other components, such as central components, armors, and wraps, are then subsequently processed in one or more steps to produce the finished cable construction. This typically includes processing on a cabling line where the components are assembled with a fabricating extruder/crosshead then used to apply the polymeric jacketing.

Test Methods

Brittleness Temperature
Determine brittleness temperature according to ASTM D746.
Melt Index @190° C.
Melt index, or $I_2$, is measured in accordance with ASTM D1238, condition 190° C./2.16 kg, and is reported in grams eluted per 10 minutes.
Melt Index @230° C.
Melt Index, or $I_2$, can also measured in accordance with ASTM D1238 at 230° C. and 2.16 kg, and is reported in grams eluted per 10 minutes.

Shrinkback

Determine shrinkage of extruded samples after aging at room temperature (21° C.). At least eight (8) samples are measured for each material. Five-foot test specimens are prepared using a steel V channel to keep the samples straight and a ruler used for marking initial length measurements. The conductors are then stretched by clamping one end down of the conductor and drawing or pulling the other end of the conductor to separate the polymer tube from the copper. The resulting polymer tubes are aged for one (1) day at 21° C. The sample lengths are measured at the 1-day time. The aged specimens are placed in the V-channel and the change in length measured using a caliper instrument with +/−0.0005 inch resolution. The average shrinkage value is reported. The commercial ESCORENE™ 7032 from Exxon Mobil is used for benchmarking results.

Tensile Modulus (Secant 2%)

Determine tensile modulus according to ASTM D638. Modulus is measured for fresh samples as well as samples exposed to LA444 gel at 85° C. for 14 days in the manner described below for determining grease resistance.

Tensile Strength (Stress at Break)

Determine tensile strength according to ASTM D638.

Tensile Elongation (Strain at Break)

Determine tensile elongation according to ASTM D638.

Weight Gain (Grease Resistance)

The hydrocarbon gel used for these studies is LA 444 manufactured by the Stewart Group. Determine gel absorption by measuring the weight gain of each sample with time. Samples 2.25 inches long (with a copper conductor left loosely in place) are immersed in the LA 444 hydrocarbon gel and then placed in an 85° C. convection oven. Each sample is initially weighed and then re-weighed after 14 days in the gel after removing all the gel from the sample surfaces.

Materials

The following materials are employed in the Examples, below.

A first crystalline polypropylene (1) is BRASKEM™ FF018F, which has a density of 0.90 g/cm$^3$, and a melt flow rate of 1.6 g/10 minutes at 230° C. and 2.16 kg. BRASKEM™ FF018F is commercially available from Braskem Chemical, Philadelphia, Pa.

A second crystalline polypropylene (2) is ESCORENE™ 7032, which has a density of 0.900 g/cm$^3$, and a melt flow rate of 4.2 g/10 minutes at 230° C. and 2.16 kg. ESCORENE™ 7032 is commercially available from ExxonMobil Chemical, Houston, Tex., USA.

DGDL-3364NT is a unimodal HDPE having a density of 0.945 g/cm$^3$ and a melt index ($I_2$) of 0.8 g/10 min. at 190° C. DGDL-3364NT is commercially available from The Dow Chemical Company, Midland, Mich., USA.

DMDA-1250NT is a bimodal HDPE having a density of 0.955 g/cm$^3$ and a melt index ($I_2$) of 1.5 g/10 min. at 190° C. DMDA-1250NT is commercially available from The Dow Chemical Company, Midland, Mich., USA.

NA-11A is a nucleating agent with the chemical name sodium 2,2'-methylene-bis-(4,6-di-tert-butylphenyl)phosphate (CAS NO.85209-91-2), which is commercially available from ADEKA Corporation, Tokyo, Japan.

HYPERFORM™ HPN-20E is a nucleating agent that is a calcium salt of 1,2-cyclohexanedicarboxylic acid and zinc stearate, which is commercially available from Milliken Chemical, Spartanburg, S.C., U.S.A.

The block composite B ("BC B") is an isotactic-polypropylene/ethylene-propylene olefin block composite having a density of 0.905 g/cm$^3$ and a melt index of 6 at 230° C.

The olefin block composite is prepared according to the following procedure. Catalyst-1 ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and cocatalyst-1, a mixture of methyldi ($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2, are purchased from Boulder Scientific and used without further purification.

CSA-1 (diethylzinc or DEZ) and cocatalyst-2 (modified methylalumoxane ("MMAO")) are purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use. The block composite is prepared using two continuous stirred tank reactors ("CSTR") connected in series. The first reactor is approximately 12 gallons in volume while the second reactor is approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 1. The first reactor contents as described in Table 1 flow to a second reactor in series. Additional monomers, solvent, hydrogen, catalyst-1, cocatalyst-1, and optionally, cocatalyst-2, are added to the second reactor.

TABLE 1

Block Composite Process Conditions

| Condition | BC B | |
| --- | --- | --- |
| | 1$^{st}$ Reactor | 2$^{nd}$ Reactor |
| Reactor Control Temp. (° C.) | 140 | 135 |
| Solvent Feed (lb/hr) | 242 | 245 |
| Propylene Feed (lb/hr) | 5.5 | 49.3 |
| Ethylene Feed (lb/hr) | 47.1 | — |
| Reactor Propylene Conc. (g/L) | 2.0 | 2.0 |
| Hydrogen Feed (SCCM) | 9.6 | 9.9 |
| Catalyst Efficiency (gPoly/gM)*10$^6$ | 0.86 | 0.03 |
| Catalyst Flow (lb/hr) | 1.96 | 2.14 |
| Catalyst Conc. (ppm) | 29.9 | 900 |
| Cocatalyst-1 Flow (lb/hr) | 1.47 | 2.16 |
| Cocatalyst-1 Conc. (ppm) | 399 | 7500 |
| Cocat.-2 Flow (lb/hr) | — | 0.3 |
| Cocat.-2 Conc. (ppm) | — | 2686 |
| DEZ Flow (lb/hr) | 0.64 | — |
| DEZ Concentration (ppm) | 3599 | — |

The block composite prepared as described above has the following properties shown in Table 2:

TABLE 2

Block Composite Properties

| Property | BC B |
| --- | --- |
| Melt Flow Rate ("MFR") (230° C./2.16 Kg) | 7.0 |
| Molecular Weight (Mw) (Kg/mol) | 128 |
| Polydispersity Index (Mw/Mn) | 4.0 |
| Total Weight Percent $C_2$ | 46.9 |
| Melting Temperature (° C.) Peak 1 | 132 |
| Crystallization Temperature (° C.) | 91 |

TABLE 2-continued

| Block Composite Properties | |
|---|---|
| Property | BC B |
| Melt Enthalpy (J/g) | 97 |
| Wt % iPP | 50 |
| Wt % EP | 50 |
| Wt % $C_2$ in EP | 90 |
| Block Composite Index | 0.707 |

EXAMPLES

Example 1 (Comparative)

Prepare six comparative samples (CS1-CS6) using the formulations provided in Table 3, below. The polypropylenes and HDPEs in CS1-CS4 are employed as received. All Comparative Samples having two or more components are prepared by blending in a Brabender mixing bowl with 250-gm capacity and rotor type mixing blades. Brabender mixing conditions are shown below:

| | |
|---|---|
| Zone 1 (° C.): | 175 |
| Zone 2 (° C.): | 170 |
| Melt (° C.): | 185-190 |
| RPM: | 50 |
| Flux (min.) | 5.0 |

Each polymeric composition of Comparative Samples CS1-CS6 is then used to prepare a mini-wire sample. Coated wire extrusion is performed on each of the materials using the Brabender Mini-wire line on 14 AWG solid gauge copper conductor. The machine settings are shown below. The equipment is used to generate samples with a final diameter of approximately 2.9 mm and a wall thickness of approximately 0.635 mm on 14 AWG solid copper conductor of 1.63 mm/0.064" diameter. Wire preheat, to 80-90° C., is applied with an industrial air heat gun directed at the copper wire before entrance to the extruder die. After extrusion, the copper conductor can be stretched and removed, and the resulting hollow polymer tube samples are used for property testing such as shrinkage, gel absorption and modulus. The Mini-Wire line extrusion parameters are shown below:

| | |
|---|---|
| Heat zones 1-4 (° C.): | 180/200/220/220 |
| Screw RPM: | 25 |
| Line speed (ft/min.): | 10 |
| Melt Temp. (° C.): | 220 |
| Die Size (in.): | 0.105 |
| Tubing tip size (in.) | 0.067 |
| Finished Diameter: | 2.9 mm (0.114 in.) |
| Cooling Water Temp. (° C.): | 35-40 |
| Wire Preheat Temp. (° C.): | 80-100 |
| Wall Thickness: | 0.635 mm (0.025 in.) |

TABLE 3

| Compositions of CS1-CS6 | | | | | | |
|---|---|---|---|---|---|---|
| | CS1 | CS2 | CS3 | CS4 | CS5 | CS6 |
| Polypropylene 1 (Braskem FF018F) (wt %) | 100 | — | — | — | 25 | 50 |
| Polypropylene 2 (Escorene 7032) (wt %) | — | 100 | — | — | — | — |
| HDPE 1 (DGDL-3364NT; unimodal) (wt %) | — | — | 100 | — | 75 | 50 |
| HDPE 2 (DMDA-1250NT; bimodal) (wt %) | — | — | — | 100 | — | — |

Analyze Comparative Samples CS1-CS6 according to the Test Methods described above. Results are provided in Table 4, below.

TABLE 4

| Properties of CS1-CS6 | | | | | | |
|---|---|---|---|---|---|---|
| | CS1 | CS2 | CS3 | CS4 | CS5 | CS6 |
| Tensile Modulus (secant 2%)* (psi) | 144,489 | 119,722 | 80,307 | 123,865 | 131,966 | 124,666 |
| Stress at break (psi) | 3,179 | 2,856 | 3,759 | 3,353 | 3,350 | 3,924 |
| Strain at break (%) | 466 | 83 | 799 | 718 | 21 | 9 |
| Low temp. brittleness, F50 (° C.) | >10 | −20 | <−65 | <−65 | >10 | >0 |
| Shrinkback (%) | 0.66 | 0.55 | 1.01 | 0.83 | 0.76 | 0.76 |
| Melt Index (g/10 min.) $I_2$ @190 C. | 0.7 | 1.8 | 0.7 | 1.4 | 1.2 | 1.1 |
| Melt Index (g/10 min.) $I_2$ @230 C. | 1.6 | 4.2 | 1.4 | 2.6 | 2.5 | 2.2 |
| Weight gain in LA444 (%) | 7.04 | 12.78 | 5.33 | 4.97 | 6.86 | 8.34 |
| Secant 2% modulus; oven/gel-aged | 35,260 | 25,733 | 27,622 | 32,348 | 29,096 | 33,338 |
| Secant 2% modulus; un-aged tube | 50,058 | 46,905 | 37,747 | 42,404 | 44,164 | 55,031 |
| Secant 2% modulus retention (%) | 70.4 | 54.9 | 73.2 | 76.3 | 65.9 | 60.6 |

*This sample measurement is performed on samples prepared according to ASTM D638 as opposed to being measured on the actual extruded mini-wire tube.

Example 2

Prepare five Samples (S1-S5) using the formulations shown in Table 5, below, using unimodal HDPE. Samples S1-S5 are prepared according to the procedure utilized for Comparative Samples CS5 and CS6, described in Example 1, above. Following preparation, each polymeric composition of Samples S1-S5 is then used to prepare a mini-wire sample in the same manner described above in Example 1.

TABLE 5

| Compositions of S1-S5 | | | | | |
|---|---|---|---|---|---|
| | S1 | S2 | S3 | S4 | S5 |
| HDPE 1 (DGDL-3364NT; unimodal) (wt %) | 65 | 50 | 64.85 | 64.8 | 64.65 |

TABLE 5-continued

Compositions of S1-S5

|  | S1 | S2 | S3 | S4 | S5 |
|---|---|---|---|---|---|
| Polypropylene 1 (Braskem FF018F) (wt %) | 25 | 40 | 25 | 25 | 25 |
| Olefin Block Composite (BC B) (wt %) | 10 | 10 | 10 | 10 | 10 |
| Nucleating agent (NA-11A) (wt %) | — | — | 0.15 | — | 0.15 |
| Nucleating agent (HPN-20E) (wt %) | — | — | — | 0.2 | 0.2 |

Analyze Samples S1-S5 according to the Test Methods described above. Results are provided in Table 6, below.

TABLE 6

Properties of S1-S5

|  | S1 | S2 | S3 | S4 | S5 |
|---|---|---|---|---|---|
| Tensile Modulus (secant 2%)* (psi) | 118,273 | 118,969 | 105,955 | 102,773 | 112,145 |
| Stress at break (psi) | 1,871 | 1,370 | 2,182 | 2,250 | 1,963 |
| Strain at break (%) | 207 | 153 | 113 | 143 | 133 |
| Low temp, brittleness, F50 (° C.) | <−65 | −38 | −47.4 | <−65 | −42.5 |
| Shrinkback (%) | 0.76 | 0.71 | 0.67 | 0.68 | 0.66 |
| Weight gain in LA444 (%) | 7.73 | 8.07 | 8.20 | 8.06 | 7.95 |
| Secant 2% modulus; oven/gel-aged | 29,219 | 34,484 | 28,483 | 31,224 | 29,358 |
| Secant 2% modulus; un-aged tube | 45,071 | 52,383 | 45,022 | 44,178 | 47,200 |
| Secant 2% modulus retention (%) | 64.8 | 65.8 | 63.3 | 70.7 | 62.2 |

*This sample measurement is performed on samples prepared according to ASTM D638 as opposed to being measured on the actual extruded mini-wire tube.

As can be seen from the results in Table 6, the combination of an HDPE with a crystalline polypropylene and olefin block composite decreases the brittleness temperature, particularly in comparison to a polypropylene alone (cf. Comparative Samples CS1 and CS2) and in comparison to a polypropylene/HDPE combination without an olefin block composite (cf. Comparative Samples CS5 and CS6). In addition, the Samples S1-S5 all show superior (lower) shrinkback compared to HDPE alone (cf. Comparative Samples CS3 and CS4).

Example 3

Prepare two Samples (S6 and S7) using the formulations shown in Table 7, below, using bimodal HDPE. Samples S6 and S7 are prepared according to the procedure described in Example 1, above. Following preparation, each polymeric composition of Samples S6 and S7 is then used to prepare a mini-wire sample in the same manner described above in Example 1.

TABLE 7

Compositions of S6 and S7

|  | S6 | S7 |
|---|---|---|
| HDPE 2 (DMDA-1250NT; bimodal) (wt %) | 65 | 50 |
| Polypropylene 1 (Braskem FF018F) (wt %) | 25 | 40 |
| Olefin Block Composite (BC B) (wt %) | 10 | 10 |

Analyze Samples S6 and S7 according to the Test Methods described above. Results are provided in Table 8, below.

TABLE 8

Properties of S6 and S7

|  | S6 | S7 |
|---|---|---|
| Tensile Modulus (secant 2%) (psi) | 107,571 | 123,365 |
| Stress at break (psi) | 2,272 | 2,439 |
| Strain at break (%) | 144 | 235 |
| Low temp. brittleness, F50 (° C.) | −48 | −28 |
| Shrinkback (%) | 0.66 | 0.61 |
| Melt Index (g/10 min.) $I_2$ @190 C. | 1.3 | 1.2 |
| Melt Flow Rate (g/10 min.) $I_2$ @230 C. | 2.6 | 2.5 |
| Weight gain in LA444 (%) | 6.9 | 7.6 |

TABLE 8-continued

Properties of S6 and S7

|  | S6 | S7 |
|---|---|---|
| Secant 2% modulus; oven/gel-aged | 29,168 | 30,290 |
| Secant 2% modulus; un-aged | 43,313 | 46,600 |
| Secant 2% modulus retention (%) | 67.3 | 65 |

As can be seen from the results in Table 8, the combination of an HDPE with a crystalline polypropylene and olefin block composite decreases the brittleness temperature, particularly in comparison to a polypropylene alone (cf. Comparative Samples CS1 and CS2) and in comparison to a polypropylene/HDPE combination without an olefin block composite (cf. Comparative Samples CS5 and CS6). In addition, the Samples S6 and S7 both show superior (lower) shrinkback compared to HDPE alone (cf. Comparative Samples CS3 and CS4).

Example 4

Prepare five additional Samples (S8-S12) using the formulations shown in Table 9, below, using varying amounts of bimodal HDPE, polypropylene 1, and BC B. Samples S8-S12 are prepared according to the procedure described in Example 1, above. Following preparation, each polymeric composition of Samples S8-S12 is then used to prepare a mini-wire sample in the same manner described above in Example 1.

TABLE 9

Compositions of S8-S12

|  | S8 | S9 | S10 | S11 | S12 |
|---|---|---|---|---|---|
| HDPE 2 (DMDA-1250NT; bimodal) (wt %) | 73.65 | 74.65 | 58.65 | 59.65 | 80.0 |

TABLE 9-continued

Compositions of S8-S12

| | S8 | S9 | S10 | S11 | S12 |
|---|---|---|---|---|---|
| Polypropylene 1 (Braskem FF018F) (wt %) | 25.00 | 5.00 | 40.00 | 20.00 | 10.00 |
| Olefin Block Composite (BC B) (wt %) | 1.00 | 20.00 | 1.00 | 20.00 | 10.00 |
| Nucleating agent (NA-11A) (wt %) | 0.15 | 0.15 | 0.15 | 0.15 | — |
| Nucleating agent (HPN-20E) (wt %) | 0.20 | 0.20 | 0.20 | 0.20 | — |

Analyze Samples S8-S12 for low temperature brittleness and shrinkback according to the Test Methods described above. Results are provided in Table 10, below.

TABLE 10

Properties of S8-S12

| | S8 | S9 | S10 | S11 | S12 |
|---|---|---|---|---|---|
| Low temp. brittleness, F50 (° C.) | >−10 | −39 | >−10 | −25 | −35 |
| Shrinkback (%) | 0.53 | 0.68 | 0.39 | 0.51 | 0.62 |

As can be seen from the results in Table 10, varying the amounts of HDPE, polypropylene, and olefin block composite still provides samples having a good balance of low temperature brittleness and shrinkback performance.

The invention claimed is:

1. A polymeric composition, comprising: (a) a bimodal high-density polyethylene; (b) a crystalline polypropylene; and (c) an olefin block composite, wherein said bimodal high-density polyethylene is present in said polymeric composition in an amount greater than said crystalline polypropylene; further comprising (d) a nucleating agent, wherein said nucleating agent is present in an amount ranging from 0.08 to 0.3 weight percent based on the entire polymeric composition weight; wherein the nucleating agent is used to nucleate the bimodal high-density polyethylene and polypropylene.

2. The polymeric composition of claim 1, wherein said olefin block composite comprises block copolymers having hard polypropylene segments and soft ethylene-propylene segments; wherein said olefin block composite is present in an amount ranging from 1 to 20 weight percent based on the entire polymeric composition weight.

3. The polymeric composition of claim 1, wherein said crystalline polypropylene is present in an amount of greater than 0 but less than 50 weight percent based on the entire polymeric composition weight; wherein said crystalline polypropylene has a crystallinity of at least 50 weight percent; wherein said bimodal high-density polyethylene is present in an amount of at least 50 weight percent based on the entire polymeric composition weight; wherein said polymeric composition comprises no low-density polyethylene.

4. The polymeric composition of claim 1, wherein said polymeric composition has a shrinkback after aging for 1 day at 21° C. of less than 0.8%; wherein said polymeric composition has a brittleness temperature of less than 0° C.

5. An extruded optical cable protective component comprising an extruded polymeric blend, said extruded polymeric blend comprising: (a) a high-density polyethylene; (b) a crystalline polypropylene; and (c) an olefin block composite, wherein said high-density polyethylene is present in said polymeric composition in an amount greater than said crystalline polypropylene; said extruded polymeric blend further comprising (d) a nucleating agent, wherein said nucleating agent is present in an amount ranging from 0.8 to 0.3 weight percent based on the entire polymeric composition weight; wherein said crystalline polypropylene is present in an amount of greater than 0 but less than 50 weight percent based on the entire polymeric composition weight; wherein said crystalline polypropylene has a crystallinity of at least 50 weight percent; wherein said high-density polyethylene is present in an amount of at least 50 weight percent based on the entire polymeric composition weight; wherein said polymeric composition comprises no low-density polyethylene; wherein the nucleating agent is used to nucleate the bimodal high-density polyethylene and polypropylene.

6. The extruded optical cable protective component of claim 5, wherein said olefin block composite comprises block copolymers having hard polypropylene segments and soft ethylene-propylene segments; wherein said olefin block composite is present in an amount ranging from 1 to 20 weight percent based on the entire polymeric composition weight.

7. The extruded optical cable protective component of claim 5, wherein said extruded optical cable protective component has a shrinkback after aging for 1 day at 21° C. of less than 0.8%; wherein said extruded optical cable protective component has a brittleness temperature of less than 0° C.

8. An optical fiber cable, comprising:
(a) the extruded optical fiber cable protective component of claim 5; and
(b) at least one optical fiber transmission medium.

* * * * *